(12) United States Patent
Kusumoto et al.

(10) Patent No.: US 6,917,571 B2
(45) Date of Patent: Jul. 12, 2005

(54) OPTICAL DISK DRIVE HAVING GAIN CONTROL TO MAINTAIN STABILITY OF A SERVO SYSTEM

(75) Inventors: Kunimasa Kusumoto, Saijo (JP); Mitsuteru Fujimoto, Saijo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 450 days.

(21) Appl. No.: 10/009,798

(22) PCT Filed: Apr. 13, 2001

(86) PCT No.: PCT/JP01/03185
§ 371 (c)(1),
(2), (4) Date: Mar. 22, 2002

(87) PCT Pub. No.: WO01/80228
PCT Pub. Date: Oct. 25, 2001

(65) Prior Publication Data
US 2002/0105896 A1 Aug. 8, 2002

(30) Foreign Application Priority Data
Apr. 14, 2000 (JP) .................................. 2000-114161

(51) Int. Cl.[7] .............................................. G11B 7/125
(52) U.S. Cl. .............................. 369/44.29; 369/53.37; 369/116
(58) Field of Search ..................... 369/44.29, 53.37, 369/44.41, 44.35, 44.36, 116

(56) References Cited

U.S. PATENT DOCUMENTS

| | | | |
|---|---|---|---|
| 4,703,466 A | 10/1987 | Konno | |
| 4,926,409 A | 5/1990 | Tsuyuguchi et al. | |
| 5,715,218 A | * 2/1998 | Ikeda | 369/44.29 |
| 5,867,463 A | * 2/1999 | Chiba | 369/53.35 |
| 6,301,212 B1 | * 10/2001 | Kubo et al. | 369/53.2 |

FOREIGN PATENT DOCUMENTS

| | | |
|---|---|---|
| JP | 63-188832 | 8/1988 |
| JP | 4-54022 | 5/1992 |
| JP | 09-274725 | 10/1997 |
| JP | 9-320067 | 12/1997 |
| JP | 2000-285480 | 10/2000 |
| JP | 2001-93165 | 6/2001 |

* cited by examiner

Primary Examiner—Brian E. Miller
Assistant Examiner—Michael V. Battaglia
(74) Attorney, Agent, or Firm—Wenderoth, Lind & Ponack, L.L.P.

(57) ABSTRACT

At spin-up of an optical disk 3, gain adjustment and offset adjustment are performed on a servo error signal to obtain a first gain adjustment value and a first offset adjustment value. Based on the first gain adjustment value, a CPU 11 obtains a second gain adjustment value and a second offset adjustment value at data writing on the optical disk 3, and stores them in storage 7. When the reading state of the optical disk 3 shifts to the writing operation, the CPU 11 controls a laser power switching circuit 12 to change the output from an optical pickup 1 and, simultaneously, reads the second offset adjustment value and gain adjustment value stored in the storage 7 and sets them in an offset adjustment unit 5 and a gain adjustment unit 8, respectively.

9 Claims, 10 Drawing Sheets

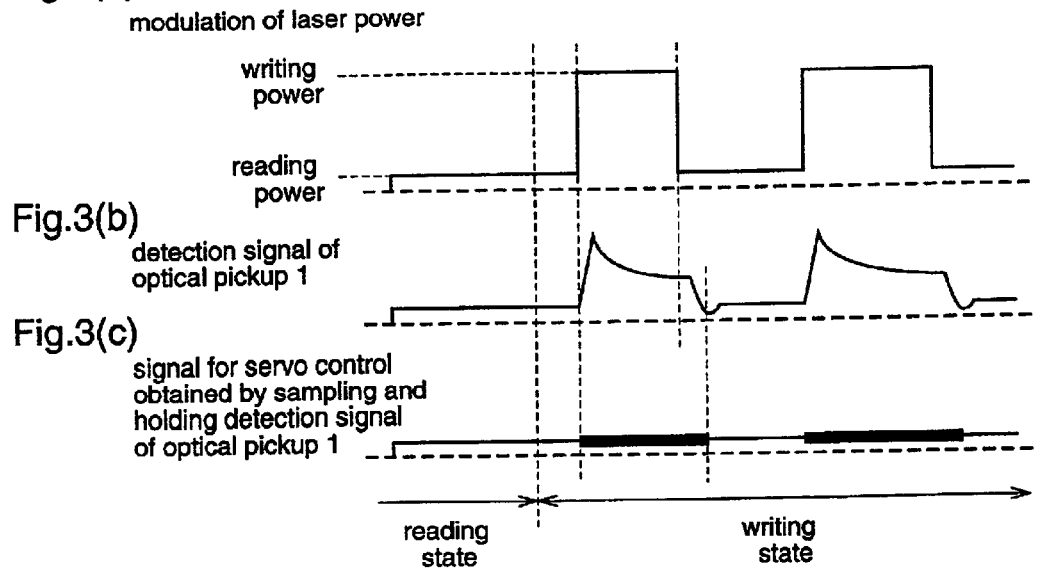
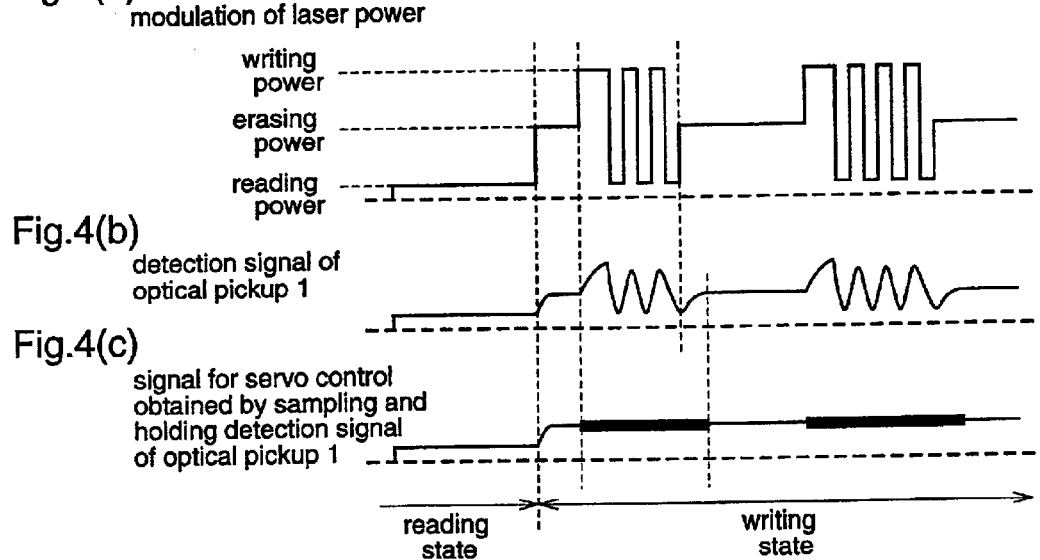

OPTICAL DISK DRIVE HAVING GAIN CONTROL TO MAINTAIN STABILITY OF A SERVO SYSTEM

TECHNICAL FIELD

The present invention relates to an optical writing/reading apparatus for optically writing, erasing, or reading a signal on a recording medium by employing a light source such as a laser and, more particularly, to offset adjustment in a rewritable optical disk drive such as a CD-RW (Compact Disc-ReWritable) drive.

BACKGROUND ART

In recent years, an automatic adjustment function of a control system in an optical writing/reading apparatus has been developed by introducing a microcomputer. Conventionally, there is an optical writing/reading apparatus disclosed in Japanese Published Patent Application No. Hei. 9-320067, wherein the power of a laser applied to a recording medium is alternately switched between the power at reading and the power at erasing, and a top peak value and a bottom peak value of an error signal which is outputted from an AGC (Auto Gain Control) at this power switching are detected by a peak hold circuit, and then offset adjustment is performed to remove a difference between these peak values.

Hereinafter, a description will be given of an optical disk drive which performs reading, writing, or erasing of an optical disk, for example, a CD-R (Compact Disc-Recordable) or a CD-RW (Compact Disc-ReWritable), as a conventional optical writing/reading apparatus.

FIG. 11 is a block diagram illustrating the construction of a conventional optical disk drive.

An optical pickup 1 is composed of optical elements such as a laser light source like a laser diode, a collimator lens, an objective lens, a polarization beam splitter, a cylindrical lens, and the like, and a photodetector (not shown) having light-receptive parts of predetermined patterns, and the objective lens is driven by a two-axis actuator (not shown).

The optical pickup 1 detects a reflected light of a laser which is applied to a target track on an optical disk 3 being rotated by a spindle motor 2. The detected signal includes a reading signal which is obtained during reading on the basis of the amount of the reflected laser light from the optical disk 3, and address information by wobbling grooves.

An error signal generation unit 4 generates a focus error (FE) signal by the astigmatism method on the basis of the signal supplied from the optical pickup 1, generates a tracking error (TE) signal by the push-pull method, and outputs these servo error signals SE1 to an offset adjustment unit 5.

The offset adjustment unit 5 adds or subtracts an offset adjustment value stored in a storage means 7 to/from the servo error signal SE1 supplied from the error signal generation unit 4 to cancel an offset of the servo error signal SE1, and outputs the offset-canceled servo error signal SE2.

An AGC 15 normalizes the servo error signal SE2 received from the offset adjustment unit 5, on the basis of a signal indicating the sum total of the amount of light detected by the photodetector, and outputs the normalized servo error signal SE3 to a control unit 9.

The control unit 9 determines the characteristics of a servo loop, such as phase compensation of the servo error signal SE3 and the like, and outputs the servo error signal SE4 to a driver 10.

The driver 10 is a circuit for driving focusing and tracking actuators. On receipt of the servo error signal SE4 from the control unit 9, the driver 10 performs focusing and tracking control so as to bring the objective lens in the optical pickup 1 into an optimum state with respect to the optical disk 3.

A laser power switching circuit 12 changes the laser power emitted from the optical pickup 1, thereby performing reading/erasing of data from the optical disk 3, or writing of data into the optical disk 3.

An offset detection unit 6 has a peak hold circuit. The offset detection unit 6 detects the servo error signal SE1 when the laser power switching circuit 12 switches the laser power from the optical pickup 1 alternately between the reading state and the erasing state. The peak hold circuit (not shown) detects a top peak value and a bottom peak value of the servo error signal SE1 in the reading or writing state of the optical disk 1, and stores these values in the storage means 7. Further, the offset detection unit 6 detects a difference in the servo error signals between the reading state and the writing state of the optical disk 3 on the basis of the top peak value and the bottom peak value of the servo error signal which are stored in the storage means 7, and obtains an offset adjustment value which cancels this difference, and stores the offset adjustment value in the storage means 7.

As described above, the conventional optical disk drive performs offset adjustment and gain adjustment for the focusing and tracking servo system during reading or writing of the optical disk 3, thereby controlling the servo system so that the objective lens in the optical pickup 1 is brought into an optimum state with respect to the optical disk 3.

In the conventional technique described above, however, when performing writing on a recordable optical disk such as a CD-R (Compact Disc-Recordable) or a CD-RW (Compact Disc-ReWritable), the gain of the servo loop is temporarily increased due to a response delay from when the laser power switching circuit changes the laser power to when the AGC completes gain control, whereby the servo system becomes unstable, resulting in the fear of off-servo. The influence might be increased especially when the laser power is changed at high speed as in the OPC (Optimum Power Control) operation seeking for the optimum writing power, or when high-speed writing on the optical disk is carried out by the improved technique in the recent development of optical disk drives.

Further, since, in the conventional method, offset capturing is carried out by alternately switching the laser output power between the reading power and the erasing power, data written on the disk might be destroyed.

Furthermore, in the writing operation on the CD-RW disk, because it is necessary to servo-control the optical pickup on the basis of the detection signal of the reflected light from the disk at the erasing power of the laser, an offset adjustment value for writing is required aside from an offset adjustment value for reading during which the optical pickup is servo-controlled with the detection signal of the reflected light from the disk at the reading power. Moreover, in the push-pull method as the tracking error signal generation method, since an optical offset may occur due to deviation of the optical axis of the photodetector as a light-receptive element, an offset adjustment value for writing must be obtained considering the optical offset.

The present invention is made in view of the above-mentioned situation and has for its object to provide an optical disk drive which can quickly perform gain control to maintain the stability of the servo system, even when the gain of the servo system changes significantly when performing writing on the optical disk.

DISCLOSURE OF THE INVENTION

The present invention is made to achieve the above-described object, and an optical disk drive according to a first aspect of the present invention comprises an optical pickup for emitting a laser to an optical disk as a recording medium, and signal-processing a reflected light from the optical disk; a servo error signal generation means for generating a servo error signal of a focusing and tracking servo system from the reflected light; an offset detection means for detecting an offset which occurs in the servo error signal due to defocusing or detracking of an objective lens in the optical pickup, and obtaining an offset adjustment value for canceling the offset; an offset adjustment means for adding the offset adjustment value to the servo system to cancel the offset of the servo system which is detected by the offset detection means; a gain adjustment means for adjusting the gain of the servo system; a laser power switching means for changing the power of the laser emitted from the optical pickup; a command means for outputting an offset adjustment command, a gain adjustment command, and a laser power switching command to the offset adjustment means, the gain adjustment means, and the laser power adjustment means, respectively; a storage means for holding an offset adjustment value, a gain adjustment value, and a laser power, which are to be set in the offset adjustment means, the gain adjustment means, and the laser power adjustment means, respectively; and a driving means for receiving the servo error signal, and outputting a driving signal for controlling the optical pickup; wherein a first gain adjustment value and a first offset adjustment value to be set in the servo system are stored in the storage means, when the laser power emitted from the optical pickup is a first laser power; and the optical disk drive is characterized by that a second gain adjustment value to be set in the servo system when a second laser power is emitted from the optical pickup is obtained by arithmetic operation on the basis of the first gain adjustment value, the second gain adjustment value is set in the gain adjustment means, and a second offset adjustment value for canceling an offset which occurs in the servo system is obtained, and then, the second laser power, gain adjustment value, and offset adjustment value are stored in the storage means, and when the first laser power is switched to the second laser power during the actual operation, the switching of the laser power and the switching from the first gain adjustment value and offset adjustment value to the second gain adjustment value and offset adjustment value are carried out simultaneously.

According to a second aspect of the present invention, in the optical disk drive defined in the first aspect, the second gain adjustment value is in proportion to the reciprocal of the ratio of the second laser power when the first laser power is used as the reference.

According to a third aspect of the present invention, in the optical disk drive defined in in the first aspect, the first laser power is a laser power at a reading level, and the second laser power is a laser power at an erasing level.

According to a fourth aspect of the present invention, an optical disk drive comprises an optical pickup for emitting a laser to an optical disk as a recording medium, and signal-processing a reflected light from the optical disk; a servo error signal generation means for generating a servo error signal of a focusing and tracking servo system from the reflected light; an offset detection means for detecting an offset which occurs in the servo error signal due to defocusing or detracking of an objective lens in the optical pickup, and obtaining an offset adjustment value for canceling the offset; an offset adjustment means for adding the offset adjustment value to the servo system to cancel the offset of the servo system which is detected by the offset detection means; a gain adjustment means for adjusting the gain of the servo system; a laser power switching means for changing the power of the laser emitted from the optical pickup; a command means for outputting an offset adjustment command, a gain adjustment command, and a laser power switching command to the offset adjustment means, the gain adjustment means, and the laser power switching means, respectively; a storage means for holding an offset adjustment value, a gain adjustment value, and a laser power, which are to be set in the offset adjustment means, the gain adjustment means, and the laser power switching means, respectively; and a driving means for receiving the servo error signal, and outputting a driving signal for controlling the optical pickup; wherein a first gain adjustment value and a first offset adjustment value to be set in the servo system are stored in a first storage area provided in the storage means, when the laser power emitted from the optical pickup is a first laser power; and the optical disk drive is characterized in that, after the first gain adjustment value and offset adjustment value obtained by the adjustment operation are stored in the first storage area, the command means outputs a command for turning off the laser output from the optical pickup to the laser power switching means and, after the laser output is turned off, second to m-th (in: integer not less than 2) gain adjustment values to be set in the servo system when second to m-th laser powers are emitted from the optical pickup are obtained by arithmetic operation based on the first gain adjustment value, and the second to m-th gain adjustment values are set in the gain adjustment means, and then, second to m-th offset adjustment values for canceling offsets that occur in the servo system are obtained, and the second to m-th laser powers, gain adjustment values, and offset adjustment values are stored in second to m-th storage areas provided in the storage means, respectively, and, during the actual operation, when the laser power is switched from the first laser power to an m-th (n: integer not less than 2 and not larger than m) laser power among the second to m-th laser powers, the switching of the laser power and the switching of the first gain adjustment value and offset adjustment value to the m-th gain adjustment value and offset adjustment value are carried out simultaneously.

According to a fifth aspect of the present invention, in the optical disk drive defined in the fourth aspect, the second to m-th gain adjustment values are in proportion to the reciprocals of the ratios of the second to m-th laser powers when the first laser power is used as the reference.

According to a sixth aspect of the present invention, in the optical disk drive defined in the fourth aspect, the first laser power is a laser power at a reading level, and the second to m-th (in: integer not less than 2) laser powers are laser powers at erasing levels.

According to a seventh aspect of the present invention, an optical disk drive comprises an optical pickup for emitting a laser to an optical disk as a recording medium, and signal-processing a reflected light from the optical disk; a tracking error signal generation means for generating a tracking error signal of a tracking servo from the reflected light; an offset detection means for detecting an offset which occurs in the tracking error signal due to detracking of an objective lens in the optical pickup or deviation of the optical axis of a photodetector, and obtaining an offset adjustment value for canceling the offset; first and second offset adjustment means for adding two offset adjustment values to the tracking error signal to cancel the offset of the tracking error signal which is detected by the offset detection means; a gain adjustment means for adjusting the gain of the tracking servo; a laser power switching means for changing the power of the laser emitted from the optical pickup; a command means for outputting an offset adjustment command, a gain adjustment command, and a laser power switching command to the first and second offset adjustment means, the gain adjustment means, and the laser power switching means, respectively; a storage means for holding two offset adjustment values, a gain adjustment value, and a laser power, which are to be set in the first and second offset adjustment means, the gain adjustment means, and the laser power switching means, respectively; and a driving means for receiving the tracking error signal, and outputting a driving signal for controlling the optical pickup; wherein the offset adjustment and gain adjustment of the tracking servo are carried out after the focusing is turned on in the state where a first laser power is set in the laser power switching means, and the first offset adjustment value, gain adjustment value, and laser power which are set by the above-described adjustments are stored as first adjustment values in a first storage area provided in the storage means; and the optical disk drive is characterized in that, after the first adjustment values obtained by the adjustment operation are stored in the first storage area, the command means outputs a command for turning off the laser output to the laser power switching means and, after the laser output is turned off, second to m-th gain adjustment values to be set in the servo system when second to m-th (in: integer not less than 2) laser powers are emitted from the optical pickup are obtained by arithmetic operation based on the first gain adjustment value, and the second to m-th gain adjustment values are set in the gain adjustment means, and then, second to m-th offset adjustment values for canceling offsets that occur in the servo system are obtained, and the second to m-th laser powers, gain adjustment values, and offset adjustment values are stored in second to m-th storage areas provided in the storage means, respectively, and, during the actual operation, when the laser power is switched from the first laser power to an m-th laser power among the second to m-th laser powers, the first offset adjustment value and the m-th offset adjustment value are set in the first offset adjustment means and the second offset adjustment means, respectively, simultaneously with the switching of the laser power from the first laser power to the n-th laser power.

According to an eight aspect of the present invention, in the optical disk drive defined in the seventh aspect a tracking error signal generation method employed by the tracking error signal generation mans is a push-pull method.

According to a ninth aspect of the present invention, in the optical disk drive defined in the seventh aspect, the first laser power is a laser power at a reading level, and the second to m-th laser powers are laser powers at erasing levels.

As described above, the optical disk drive according to the first aspect comprises an optical pickup for emitting a laser to an optical disk as a recording medium, and signal-processing a reflected light from the optical disk; a servo error signal generation means for generating a servo error signal of a focusing and tracking servo system from the reflected light; an offset detection means for detecting an offset which occurs in the servo error signal due to defocusing or detracking of an objective lens in the optical pickup, and obtaining an offset adjustment value for canceling the offset; an offset adjustment means for adding the offset adjustment value to the servo system to cancel the offset of the servo system which is detected by the offset detection means; a gain adjustment means for adjusting the gain of the servo system; a laser power switching means for changing the power of the laser emitted from the optical pickup; a command means for outputting an offset adjustment command, a gain adjustment command, and a laser power switching command to the offset adjustment means, the gain adjustment means, and the laser power adjustment means, respectively; a storage means for holding an offset adjustment value, a gain adjustment value, and a laser power, which are to be set in the offset adjustment means, the gain adjustment means, and the laser power adjustment means, respectively; and a driving means for receiving the servo error signal, and outputting a driving signal for controlling the optical pickup; wherein a first gain adjustment value and a first offset adjustment value to be set in the servo system are stored in the storage means, when the laser power emitted from the optical pickup is a first laser power; and the optical disk drive is characterized by that a second gain adjustment value to be set in the servo system when a second laser power is emitted from the optical pickup is obtained by arithmetic operation on the basis of the first gain adjustment value, the second gain adjustment value is set in the gain adjustment means, and a second offset adjustment value for canceling an offset which occurs in the servo system is obtained, and then, the second laser power, gain adjustment value, and offset adjustment value are stored in the storage means, and when the first laser power is switched to the second laser power during the actual operation, the switching of the laser power and the switching from the first gain adjustment value and offset adjustment value to the second gain adjustment value and offset adjustment value are carried out simultaneously. Therefore, the servo error signal offset adjustment and the gain adjustment can be carried out simultaneously with the switching of the output from the optical pickup, whereby malfunctions of the servo system due to a response delay in the gain adjustment after the laser power change are avoided, resulting in an optical disk drive with stable operation.

According to the third aspect of the present invention, in the optical disk drive defined in the first aspect, the first laser power is a laser power at a reading level, and the second laser power is a laser power at an erasing level. Therefore, for example, when the optical disk drive shifts from the optical disk reading state to the writing operation, the servo error signal offset adjustment and the gain adjustment can be carried out simultaneously with the switching of the output from the optical pickup, whereby malfunctions of the servo system due to a response delay in the gain adjustment after the laser power change are avoided, resulting in an optical disk drive with stable operation.

According to the fourth aspect of the present invention, an optical disk drive comprises an optical pickup for emitting a laser to an optical disk as a recording medium, and signal-processing a reflected light from the optical disk; a servo error signal generation means for generating a servo error signal of a focusing and tracking servo system from the reflected light; an offset detection means for detecting an offset which occurs in the servo error signal due to defocusing or detracking of an objective lens in the optical pickup, and obtaining an offset adjustment value for canceling the offset; an offset adjustment means for adding the offset adjustment value to the servo system to cancel the offset of the servo system which is detected by the offset detection means; a gain adjustment means for adjusting the gain of the servo system; a laser power switching means for changing the power of the laser emitted from the optical pickup; a command means for outputting an offset adjustment command, a gain adjustment command, and a laser power switching command to the offset adjustment means, the gain adjustment means, and the laser power switching means, respectively; a storage means for holding an offset adjustment value, a gain adjustment value, and a laser power, which are to be set in the offset adjustment means, the gain adjustment means, and the laser power switching means, respectively; and a driving means for receiving the servo error signal, and outputting a driving signal for controlling the optical pickup; wherein a first gain adjustment value and a first offset adjustment value to be set in the servo system are stored in a first storage area provided in the storage means, when the laser power emitted from the optical pickup is a first laser power; and the optical disk drive is characterized that, after the first gain adjustment value and offset adjustment value obtained by the adjustment operation are stored in the first storage area, the command means outputs a command for turning off the laser output from the optical pickup to the laser power switching means and, after the laser output is turned off, second to m-th (in: integer not less than 2) gain adjustment values to be set in the servo system when second to m-th laser powers are emitted from the optical pickup are obtained by arithmetic operation based on the first gain adjustment value, and the second to m-th gain adjustment values are set in the gain adjustment means, and then, second to m-th offset adjustment values for canceling offsets that occur in the servo system are obtained, and the second to m-th laser powers, gain adjustment values, and offset adjustment values are stored in second to m-th storage areas provided in the storage means, respectively, and, during the actual operation, when the laser power is switched from the first laser power to an n-th (n: integer not less than 2 and not larger than m) laser power among the second to m-th laser powers, the switching of the laser power and the switching of the first gain adjustment value and offset adjustment value to the n-th gain adjustment value and offset adjustment value are carried out simultaneously. Therefore, the servo error signal offset adjustment and the gain adjustment can be carried out simultaneously with the switching of the output from the optical pickup, whereby malfunctions of the servo system due to a response delay in the gain adjustment after the laser power change are avoided, resulting in an optical disk drive with stable operation. Further, since the gain adjustment values of the second to m-th laser powers are obtained while the laser from the optical pickup is turned off, there is no fear of destruction of the data on the disk even when the second to m-th laser powers are laser powers in the erasing state.

According to the sixth aspect of the present invention, in the optical disk drive defined in the fourth aspect, the first laser power is a laser power at a reading level, and the second to m-th (in: integer not less than 2) laser powers are laser powers at erasing levels. Therefore, when the optical disk drive shifts from the optical disk reading state to the writing operation, the servo error signal offset adjustment and the gain adjustment can be carried out simultaneously with the switching of the output from the optical pickup, whereby malfunctions of the servo system due to a response delay in the gain adjustment after the laser power change are avoided, resulting in an optical disk drive with stable operation.

According to the seventh aspect of the present invention, an optical disk drive comprises an optical pickup for emitting a laser to an optical disk as a recording medium, and signal-processing a reflected light from the optical disk; a tracking error signal generation means for generating a tracking error signal of a tracking servo from the reflected light; an offset detection means for detecting an offset which occurs in the tracking error signal due to detracking of an objective lens in the optical pickup or deviation of the optical axis of a photodetector, and obtaining an offset adjustment value for canceling the offset; first and second offset adjustment means for adding two offset adjustment values to the tracking error signal to cancel the offset of the tracking error signal which is detected by the offset detection means; a gain adjustment means for adjusting the gain of the tracking servo; a laser power switching means for changing the power of the laser emitted from the optical pickup; a command means for outputting an offset adjustment command, a gain adjustment command, and a laser power switching command to the first and second offset adjustment means, the gain adjustment means, and the laser power switching means, respectively; a storage means for holding two offset adjustment values, a gain adjustment value, and a laser power, which are to be set in the first and second offset adjustment means, the gain adjustment means, and the laser power switching means, respectively; and a driving means for receiving the tracking error signal, and outputting a driving signal for controlling the optical pickup; wherein the offset adjustment and gain adjustment of the tracking servo are carried out after the focusing is turned on in the state where a first laser power is set in the laser power switching means, and the first offset adjustment value, gain adjustment value, and laser power which are set by the above-described adjustments are stored as first adjustment values in a first storage area provided in the storage means; and the optical disk drive is characterized in that, after the first adjustment values obtained by the adjustment operation are stored in the first storage area, the command means outputs a command for turning off the laser output to the laser power switching means and, after the laser output is turned off, second to m-th gain adjustment values to be set in the servo system when second to m-th (m: integer not less than 2) laser powers are emitted from the optical pickup are obtained by arithmetic operation based on the first gain adjustment value, and the second to m-th gain adjustment values are set in the gain adjustment means, and then, second to m-th offset adjustment values for canceling offsets that occur in the servo system are obtained, and the second to m-th laser powers, gain adjustment values, and offset adjustment values are stored in second to m-th storage areas provided in the storage means, respectively, and, during the actual operation, when the laser power is switched from the first laser power to an n-th laser power among the second to m-th laser powers, the first offset adjustment value and the n-th offset adjustment value are set in the first offset adjustment means and the second offset adjustment means, respectively, simultaneously with the switching of the laser power from the first laser power to the n-th laser power. Therefore, an optical offset, which occurs in the tracking error signal due to a deviation of the optical axis of the optical pickup or the like, can be canceled. Accordingly, even when the gain of the servo system changes significantly due to the switching of the laser power of the optical pickup from the first laser power to the n-th laser power, the offset can be canceled with reliability, resulting in an optical disk drive with stable operation. Furthermore, since the gain adjustment values of the second to m-th laser powers are obtained while the laser from the optical pickup is turned off, there is no fear of destruction of the data on the disk even when the second to m-th laser powers are laser powers in the erasing state.

According to the ninth aspect of the present invention, in the optical disk drive defined in the seventh aspect, the first laser power is a laser power at a reading level, and the second to m-th laser powers are laser powers at erasing levels. Therefore, for example, when the laser power is changed from the first laser power to the n-th laser power among the second to m-th laser powers due to the state change of the optical disk from the reading state to the writing state, even if an optical offset occurs in the tracking error signal due to a deviation of the optical axis of the optical pickup or the like, appropriate offset adjustment can be carried out. Accordingly, even when the gain of the servo system changes significantly due to the change of the laser power from the first laser power to the n-th laser power, the offset can be canceled with reliability, resulting in an optical disk drive with stable operation.

BRIEF DESCRIPTION OF THE DRAWINGS

FIGS. 3(a)–3(c) are diagrams illustrating a detection signal of a reflected light from a disk at writing of a CD-R disk, and a signal obtained by sampling and holding the detection signal, for servo control.

FIGS. 4(a)–4(c) are diagrams illustrating a detection signal of a reflected light from a disk at writing of a CD-RW disk, and a signal obtained by sampling and holding the detection signal, for servo control.

BEST MODE TO EXECUTE THE INVENTION

Hereinafter, embodiments of the present invention will be described with reference to the drawings. The embodiments described hereinafter are merely examples, and the present invention is not restricted to them.
(Embodiment 1)

Hereinafter, a description will be given of an embodiment of the present invention.

Figure 1:
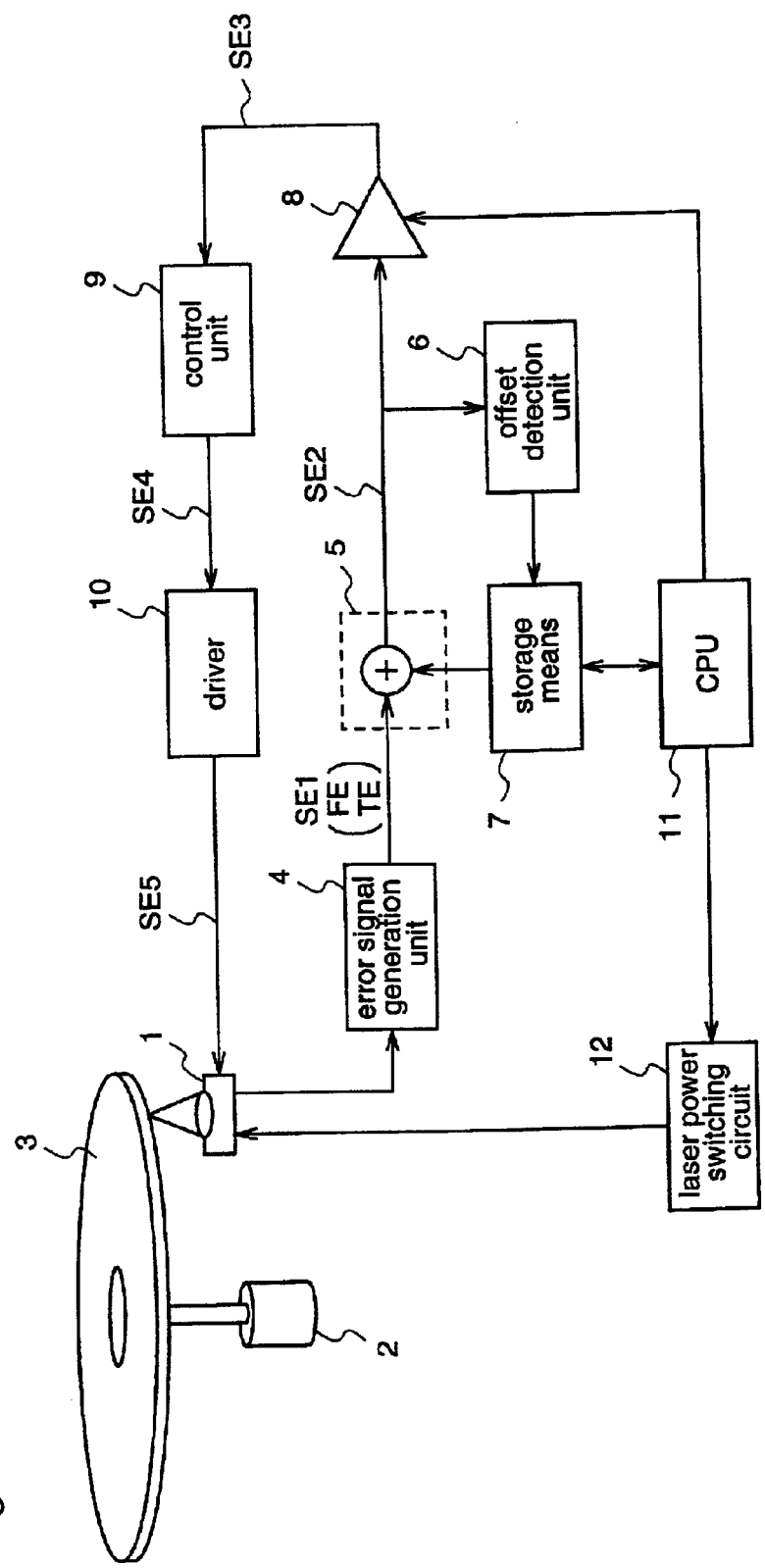
FIG. 1 is a block diagram illustrating the construction of an optical disk drive according to a first embodiment of the present invention.
Figure 11:
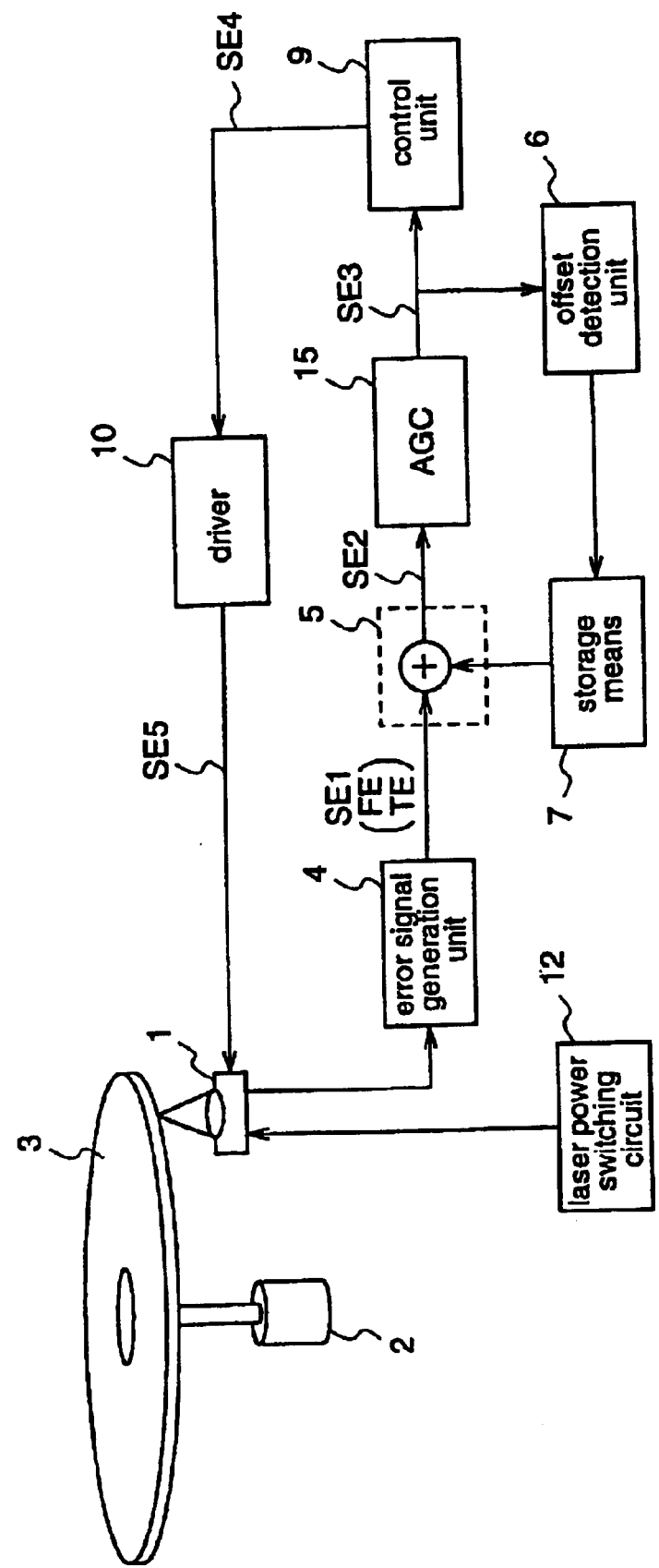
FIG. 11 is a block diagram illustrating the construction of a conventional optical disk drive.

FIG. 1 is a block diagram illustrating the construction of an optical disk drive according to a first embodiment of the present invention. In FIG. 1, the same reference numerals as those shown in FIG. 11 designate the same or corresponding parts.

An optical pickup 1 is composed of a laser light source like a laser diode, optical elements such as a collimator lens, an objective lens, a polarization beam splitter, a cylindrical lens, and the like (not shown), and a photodetector having light-receptive parts of predetermined patterns (not shown), and the like. The objective lens is driven by a two-axis actuator (not shown).

The optical pickup 1 applies a laser to a target track on an optical disk 3 being rotated by a spindle motor 2, and detects the reflected light. The detected signal includes a reading signal which is obtained during reading on the basis of the amount of the reflected laser light from the disk, and address information by wobbling grooves.

An error signal generation unit 4 generates a focus error (FE) signal by the astigmatism method from the signal supplied from the optical pickup 1, generates a tracking error (TE) signal by the push-pull method, and outputs these servo error signals SE1 to an offset adjustment unit 5.

In order to cancel an offset included in the servo error signal SE1 supplied from the error signal generation unit 4, the offset adjustment unit 5 reads out an offset adjustment value which has previously been obtained by an offset detection unit 6 and stored in a storage means 7, and performs offset adjustment on the servo error signal SE1.

A gain adjustment unit 8 performs gain adjustment so that the amplitude of the servo error signal SE2 from the offset adjustment unit 5 becomes constant and, thereafter, outputs the servo error signal SE3 to a control unit 9.

The control unit 9 determines the characteristics of a servo loop, such as phase compensation of the servo error signal SE3 received from the gain adjustment unit 8, and outputs the servo error signal SE4 to a driver 10.

The driver 10 is a drive circuit for focusing and tracking actuators. On receipt of the servo error signal SE4 from the control unit 9, the driver 10 performs focusing and tracking control so that the objective lens in the optical pickup 1 is brought into an optimum state with respect to the optical disk 3.

When a laser power switching unit 12 receives a laser power switching command from a CPU 11 as a command means, it switches the power of the laser emitted from the optical pickup 1 to a laser power most suitable for reading, erasing, or writing of the optical disk 3.

Figure 2:
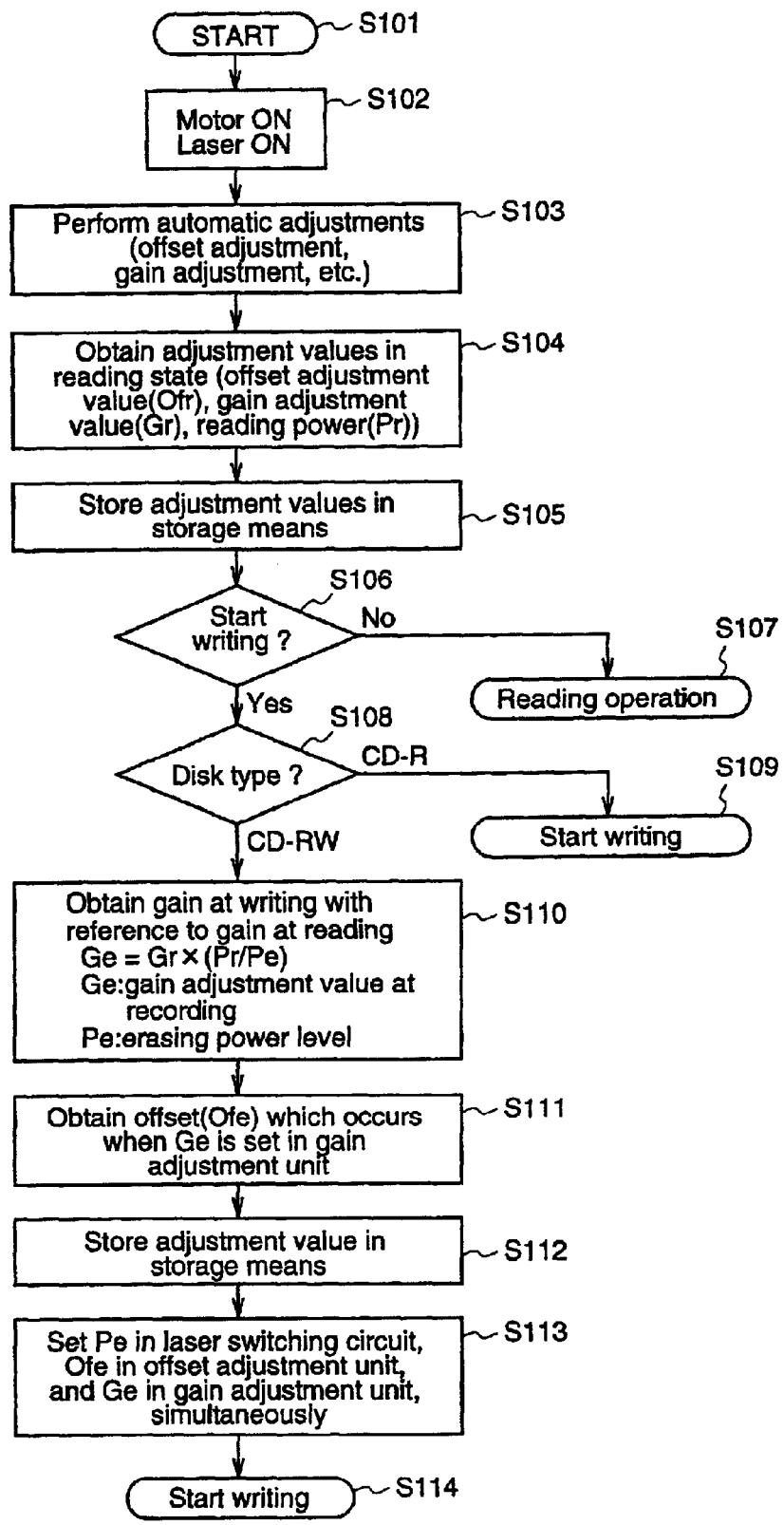
FIG. 2 is a flowchart illustrating the offset adjustment operation of the optical disk drive according to the first embodiment of the present invention.

FIG. 2 is a flowchart for explaining the offset adjustment by the optical disk drive of the first embodiment which is constructed as described above.

Initially, the drive is started or the disk is loaded (step S101) to turn on the spindle motor 2 and the laser of the optical pickup 1, whereby the drive goes into the spin-up operation (step S102).

During the spin-up operation, the offset adjustment unit 5 subjects the servo error signal SE1 generated by the error signal generation unit 4 to offset adjustment for canceling an offset of the signal SE1 from a reference voltage, and the gain adjustment unit 8 subjects the servo error signal SE2 from the offset adjustment unit 5 to gain adjustment for making the amplitude of the signal SE2 constant. Further, besides these automatic adjustments, disk discrimination by a disk discrimination means (not shown) or the like is carried out (step S103). In the present invention, an offset adjustment value (Ofr), a gain adjustment value (Gr), and a reading laser power (Pr) in the reading state of the optical disk are obtained by the above-described automatic adjustments (step S104), and thereafter, these values are stored in the storage means 7 as first adjustment values (step S105).

After the above-mentioned spin-up operation, the optical disk drive according to the present invention starts the reading operation (step S107). However, when a writing command is supplied from an operation means such as a remote controller (not shown) to the CPU 11 in step S106, the reading operation shifts to the writing operation. At this time, the optical disk drive immediately starts the writing operation (step S109) when the optical disk 3 is judged as a CD-R disk by the disk discrimination operation performed during the spin-up operation (step S108). However, when the optical disk 3 is judged as a CD-RW disk, the CPU 11 performs the following operation in step S110.

First of all, the CPU 11 reads, from the storage means 7, the first offset adjustment value Ofr, gain adjustment Gr, and reading laser power Pr which were captured when the optical disk 3 was in the reading state. Then, on the basis of these adjustment values, the CPU 11 obtains a second gain adjustment value and a second offset adjustment value which are to be set during the writing operation of the optical disk 3.

FIGS. 3(a)–3(c) and 4(a)–4(c) show a difference in servo operations at writing between a CD-R disk and a CD-RW disk, in the optical disk drive according to the present invention.

As shown in FIG. 3(a), the laser power emitted from the optical pickup 1 at reading of the CD-R disk differs from that at writing. When the optical pickup 1 emits the laser of the writing power, the amount of the reflected light changes due to the state change of the recording groove on the optical disk 3 and, as the result, the writing power detected by the light-receptive element in the optical pickup 1 changes as shown in FIG. 3(b). Therefore, as shown in FIG. 3(c), the detection signal of the reading power is sampled and held during writing of the CD-R disk to perform servo control at the reading level.

At writing of the CD-RW disk, as in the case of the CD-R disk, according to the modulation of the laser power from the optical pickup 1 (FIG. 4(a)), the detection signal from the optical pickup 1 also changes as shown in FIG. 4(b). However, during the writing operation of the CD-RW disk, in contrast with the case of the CD-R disk, the lasers of the erasing power and the writing power are emitted from the optical pickup 1. Therefore, as shown in FIG. 4(c), at writing of the CD-RW disk, the detection signal of the erasing power is sampled and held to perform servo control at the erasing level and, therefore, it is necessary to have a second gain adjustment value and a second offset adjustment value for writing aside from those for reading.

As described above, since servo control is performed at the erasing power level during writing of the CD-RW disk, the offset adjustment value and the gain adjustment value, which are obtained when the erasing power of the laser is set, are used as the second offset adjustment value and gain adjustment value at disk writing in the optical disk drive according to the present invention. The second offset adjustment value and gain adjustment value can be obtained as follows on the basis of the first offset adjustment value Ofr, gain adjustment value Gr, and reading laser power Pr at disk reading.

Assuming that the erasing power and writing power of the laser are Pe and Pw, respectively, when the writing power Pw is decided, the erasing power Pe is decided as Pe=ε×Pw (ε: constant). When the erasing power Pe is decided, the CPU 11 obtains a second gain adjustment value Ge at disk writing, according to formula (1) as follows (step S110).

$$Ge=Gr\times(Pr/Pe) \quad (1)$$

wherein, Gr: gain adjustment value at reading
Ge: gain adjustment value at writing
Pr: reading power level
Pe: erasing power level After the CPU 11 obtains the second gain adjustment value Ge by the arithmetic operation, the CPU 11 sets the second gain adjustment value Ge in the gain adjustment unit 8, detects an offset which occurs at this time in the servo system by the offset detection unit 6, and obtains a second offset adjustment value Ofe (step S111). Then, the CPU 11 stores the obtained offset adjustment value Ofe, gain adjustment value Ge, and erasing power level Pe in the storage means 7 as second adjustment values (step S112).

When starting the writing operation actually, the CPU 11 reads the second adjustment values from the storage means 7, and outputs a laser power switching command for switching the power level from the reading power level Pr to the erasing power level Pe to the laser power switching circuit 12 and, simultaneously, sets the second offset adjustment value Ofe and the second gain adjustment value Ge in the offset adjustment unit 5 and the gain adjustment unit 8, respectively (step S113). The driver 10 performs focusing and tracking control for the optical pickup 1 on the basis of the servo error signal SE4 which is inputted through the offset adjustment unit 5, the gain adjustment unit 8, and the control unit 9, and starts the writing operation (step S114).

As described above, in the optical disk drive according to the first embodiment of the present invention, when the optical disk drive shifts from the reading state of the CD-RW disk 3 to the writing operation, the CPU 11 controls the laser power switching circuit 12 so as to change the laser power from the optical pickup 1 and, simultaneously, reads the second offset adjustment value Ofe and the second gain adjustment value Ge from the storage means 7, and sets these values in the offset adjustment unit 5 and the gain adjustment unit 8, respectively. Therefore, malfunctions of the servo system due to a response delay in the gain adjustment after the laser power change are avoided, thereby providing an optical disk drive with stable operation.

(Embodiment 2)

Figure 5:
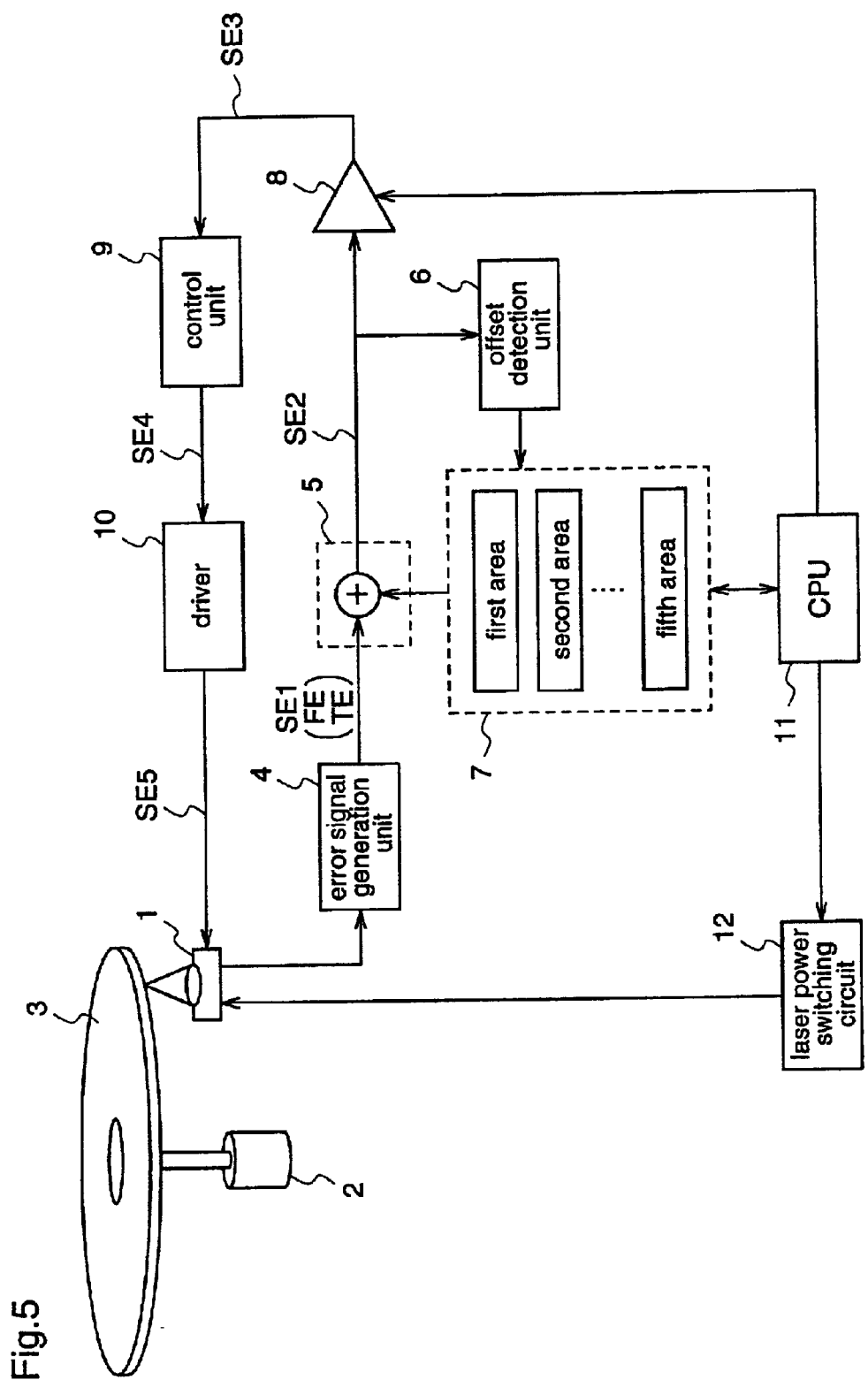
FIG. 5 is a block diagram illustrating the construction of an optical disk drive according to a second embodiment of the present invention.
Figure 6:
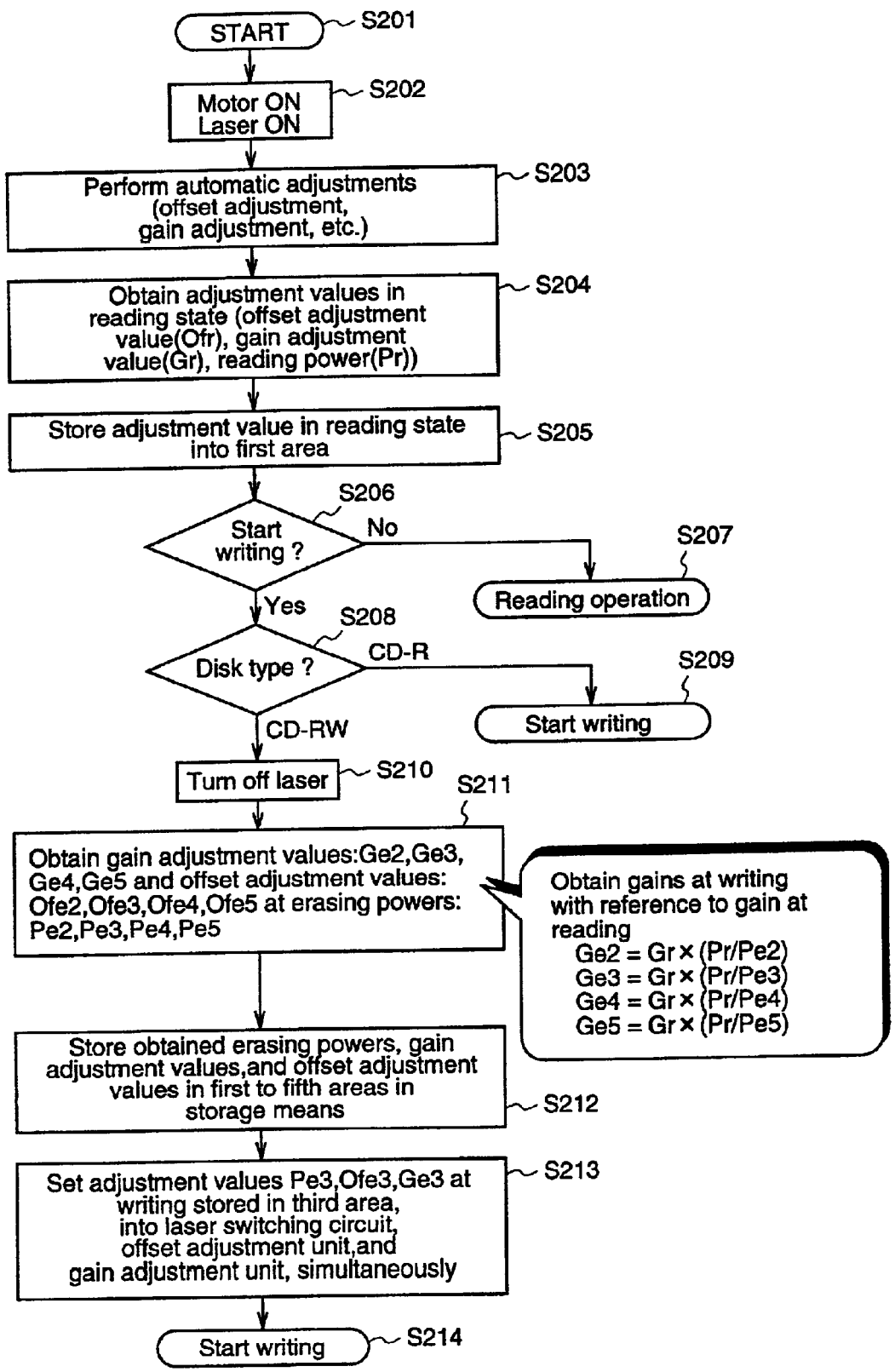
FIG. 6 is a flowchart illustrating the offset adjustment operation of the optical disk drive according to the second embodiment of the present invention.

Hereinafter, an embodiment of the present invention, will be described. FIG. 5 is a block diagram illustrating the construction of an optical disk drive according to a second embodiment of the present invention. In FIG. 5, the same reference numerals as those shown in FIG. 1 designate the same or corresponding parts and, therefore, descriptions thereof will be omitted. FIG. 6 is a flowchart for explaining offset adjustment by the optical disk drive according to the present invention.

Hereinafter, the operation of the optical disk drive according to the second embodiment of the present invention will be described with reference to FIGS. 5 and 6.

Initially, the drive is started or the disk is loaded (step S201) to turn on the spindle motor 2 and the laser of the optical pickup 1, whereby the drive goes into the spin-up operation (step S202).

During the spin-up operation, the offset adjustment unit 5 subjects the servo error signal SE1 generated by the error signal generation unit 4 to offset adjustment for canceling an offset from a reference voltage, and the gain adjustment unit 8 subjects the servo error signal SE2 from the offset adjustment unit 5 to gain adjustment for making the amplitude of the servo error signal SE2 constant. Further, besides these automatic adjustments, disk discrimination by a disk discrimination means (not shown) or the like is carried out (step S203). In the present invention, an offset adjustment value (Ofr), a gain adjustment value (Gr), and a reading laser power (Pr) in the reading state of the optical disk are obtained by the above-described automatic adjustments (step S204), and thereafter, these values are stored in the storage means 7 as first adjustment values (step S205).

After the above-mentioned spin-up operation, the optical disk drive according to the present invention starts the reading operation (step S207). However, when a writing command is supplied from an operation means such as a remote controller (not shown) to the CPU 11 in step S206, the reading operation shifts to the writing operation. At this time, the optical disk drive immediately starts the writing operation (step S209) when the optical disk 3 is judged as a CD-R disk by the disk discrimination operation performed during the spin-up operation (step S208). However, when the optical disk 3 is judged as a CDRW disk, the CPU 11 performs the following operation in step S110.

First of all, the CPU 11 outputs a laser OFF command to the laser power switching circuit 12 to turn off the laser output from the optical pickup 1 (step S210). Then, the CPU 11 reads, from the storage means 7, the first offset adjustment value Ofr, gain adjustment value Gr, and reading laser power Pr which were captured when the optical disk 3 was in the reading state, and obtains a gain adjustment value and an offset adjustment value to be set in the writing operation of the optical disk 3, on the basis of these first adjustment values (step S211).

Since, as in the first embodiment, servo control is performed at the erasing power level of the laser during writing of the CD-RW disk, the offset adjustment value and the gain adjustment value which are obtained when the erasing power is set are employed as the offset adjustment value and the gain adjustment value at writing. In the present invention, considering variations in characteristics of optical disks from maker to maker, in order to perform optimum writing operations for CD-RW disks having different characteristics, second to m-th (m: integer not less than 2) writing powers are previously set, and second to m-th adjustment values corresponding to the respective writing powers are obtained. In this second embodiment, for example, m=5.

Second to fifth gain adjustment values Ge2, Ge3, Ge4, and Ge5 are obtained according to formulae (2) to (5) as follows, respectively (step S211).

$$Ge2 = Gr \times (Pr/Pe2) \quad (2)$$

$$Ge3 = Gr \times (Pr/Pe3) \quad (3)$$

$$Ge4 = Gr \times (Pr/Pe4) \quad (4)$$

$$Ge5 = Gr \times (Pr/Pe5) \quad (5)$$

After obtaining the second to fifth gain adjustment values Ge2~Ge5, the CPU 11 sets the first to fifth gain adjustment values Ge2~Ge5 successively in the gain adjustment unit 8. At this time, the offset detection unit 6 detects an offset value which occurs in the servo system, and obtains second to fifth offset adjustment values Ofe2~Ofe5 (step S211). These second to fifth offset adjustment values Ofe2~Ofe5 as well as the second to fifth gain adjustment values Ge2~Ge5 and the second to fifth laser powers Pe2~Pe5 are stored as second to fifth adjustment values in second to fifth areas provided in the storage means 7, respectively (step S212).

When actually starting the writing operation, in order to perform writing with an optimum laser power for the optical disk 3, the CPU 11 reads, for example, the third adjustment values from the third area in the storage means 7 where the adjustment values corresponding to the optimum laser power are stored, and outputs a command for switching the laser power from the first laser power Pr to the third laser power Pe3 to the laser power switching circuit 12 and, simultaneously, sets the third offset adjustment value Ofe3 and the third gain adjustment value Ge3 in the offset adjustment unit 5 and the gain adjustment unit 8, respectively (step S213). The driver 10 performs focusing and tracking control for the optical pickup 1 on the basis of the servo error signal SE4 which are inputted through the offset adjustment unit 5, the gain adjustment unit 8, and the control unit 9, and starts the writing operation (step S214).

As described above, in the optical disk drive according to the second embodiment of the present invention, when the optical disk drive shifts from the reading state of the CD-RW disk 3 to the writing operation at an arbitrary n-th (n=2, . . . , m) laser power Pen, the CPU 11 controls the laser power switching circuit 12 so as to change the laser power from the optical pickup 1 and, simultaneously, reads the n-th offset adjustment value Ofen and the n-th gain adjustment value Gen from the storage means 7, and sets these values in the offset adjustment unit 5 and the gain adjustment unit 8, respectively. Therefore, malfunctions of the servo system due to a response delay in the gain adjustment after the laser power change are avoided, thereby providing an optical disk drive with stable operation. Further, since the gain adjustment values Ge2~Gem corresponding to the second to m-th (m: integer not less than 2) laser powers Pe are obtained while the laser power from the optical pickup 1 is turned off, there is no fear of destruction of data on the optical disk 3 even when the second to m-th laser powers are erasing powers.

(Embodiment 3)

Figure 7:
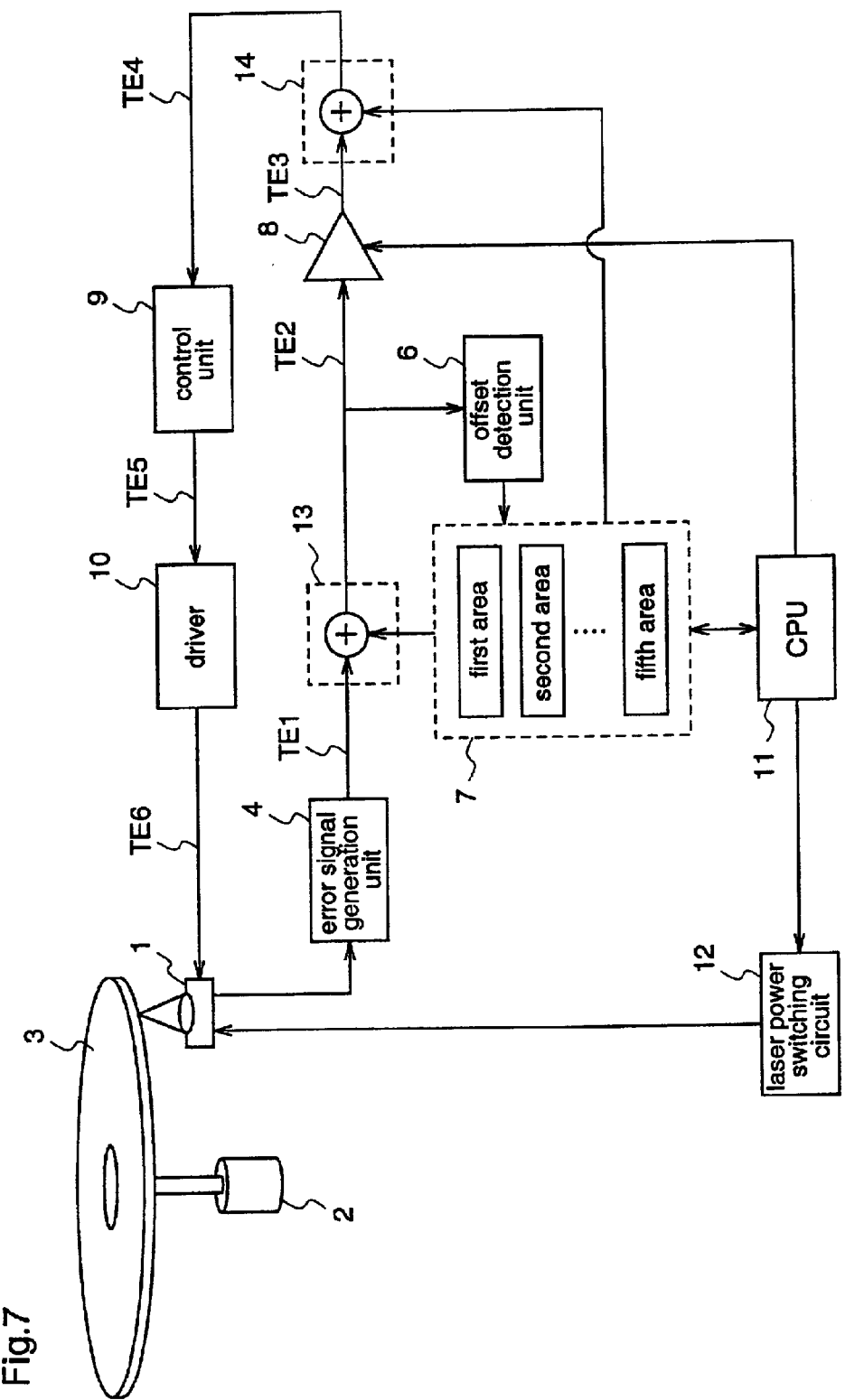
FIG. 7 is a block diagram illustrating the construction of an optical disk drive according to a third embodiment of the present invention.

Hereinafter, an embodiment of the present invention will be described. FIG. 7 is a block diagram illustrating the construction of an optical disk drive according to a third embodiment of the present invention. In FIG. 7, the same reference numerals as those shown in FIG. 5 denote the same or corresponding parts, and descriptions thereof will be omitted.

An optical disk drive according to the third embodiment performs gain adjustment and offset adjustment on a tracking error (TE) signal relating to a tracking servo system, among the servo error signals. In the optical disk drive of the present invention, when the reading operation of the optical disk 3 shifts to the writing operation, two adjustment values selected from the plural offset adjustment values stored in the storage means 7 are set in a first offset adjustment unit 13 and a second offset adjustment unit 14, respectively, and offset adjustment of a tracking error signal TE1 generated by the error signal generation unit 4 is carried out in two stages.

Figure 8:
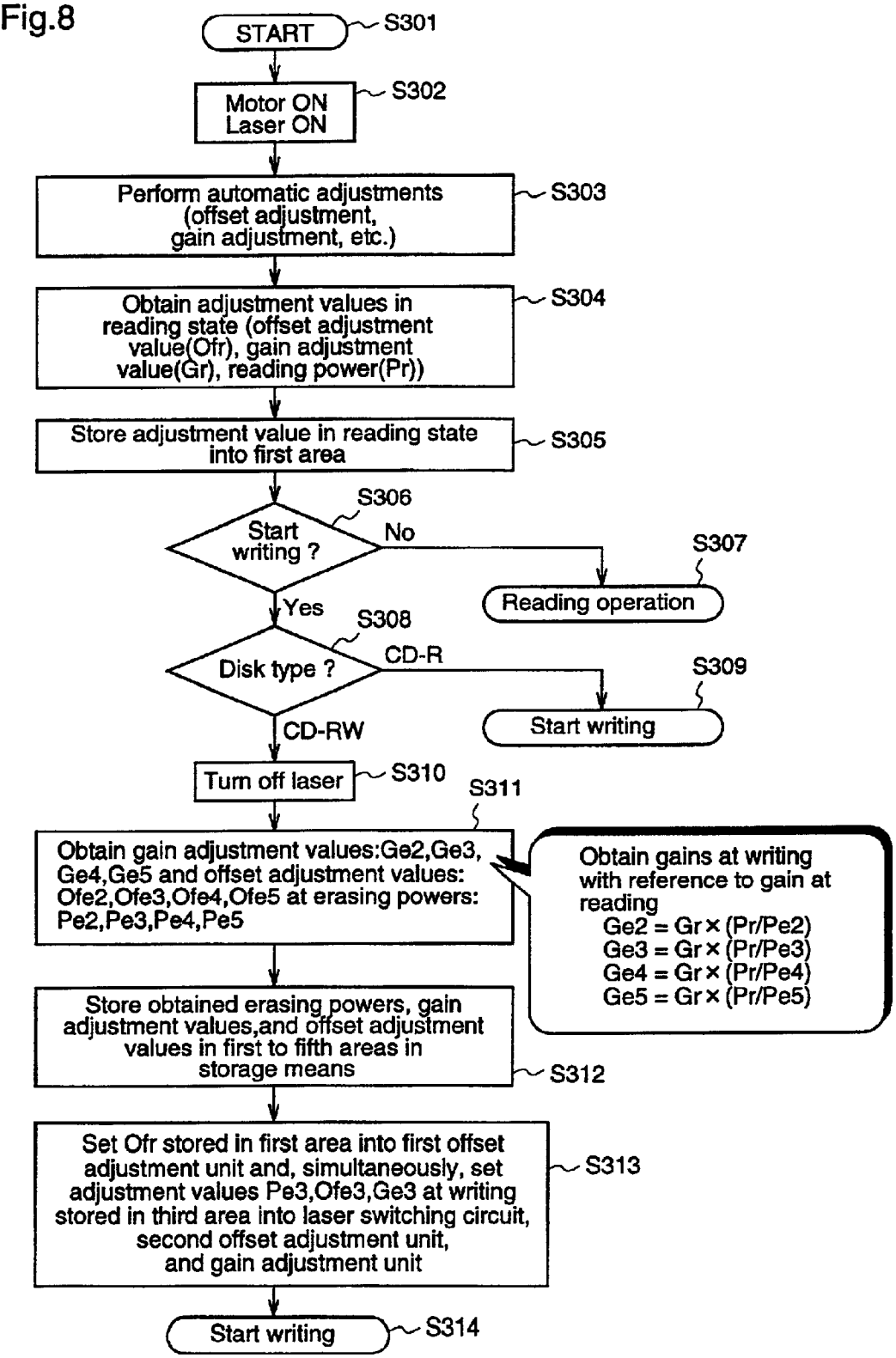
FIG. 8 is a flowchart illustrating the offset adjustment operation of the optical disk drive according to the third embodiment of the present invention.
Figure 9:
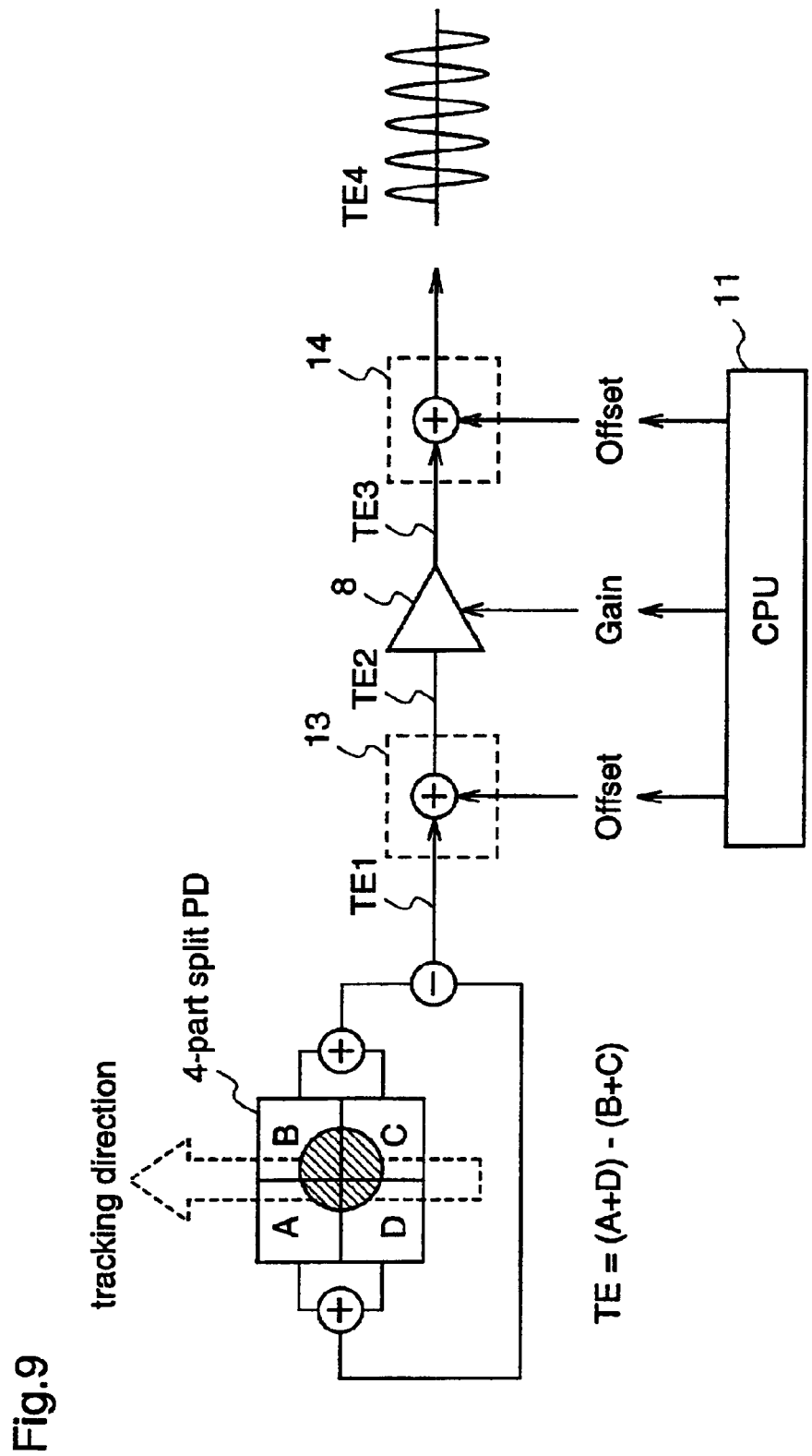
FIG. 9 is a diagram illustrating a method for detecting a TE signal, employing the push-pull method.
Figure 10:
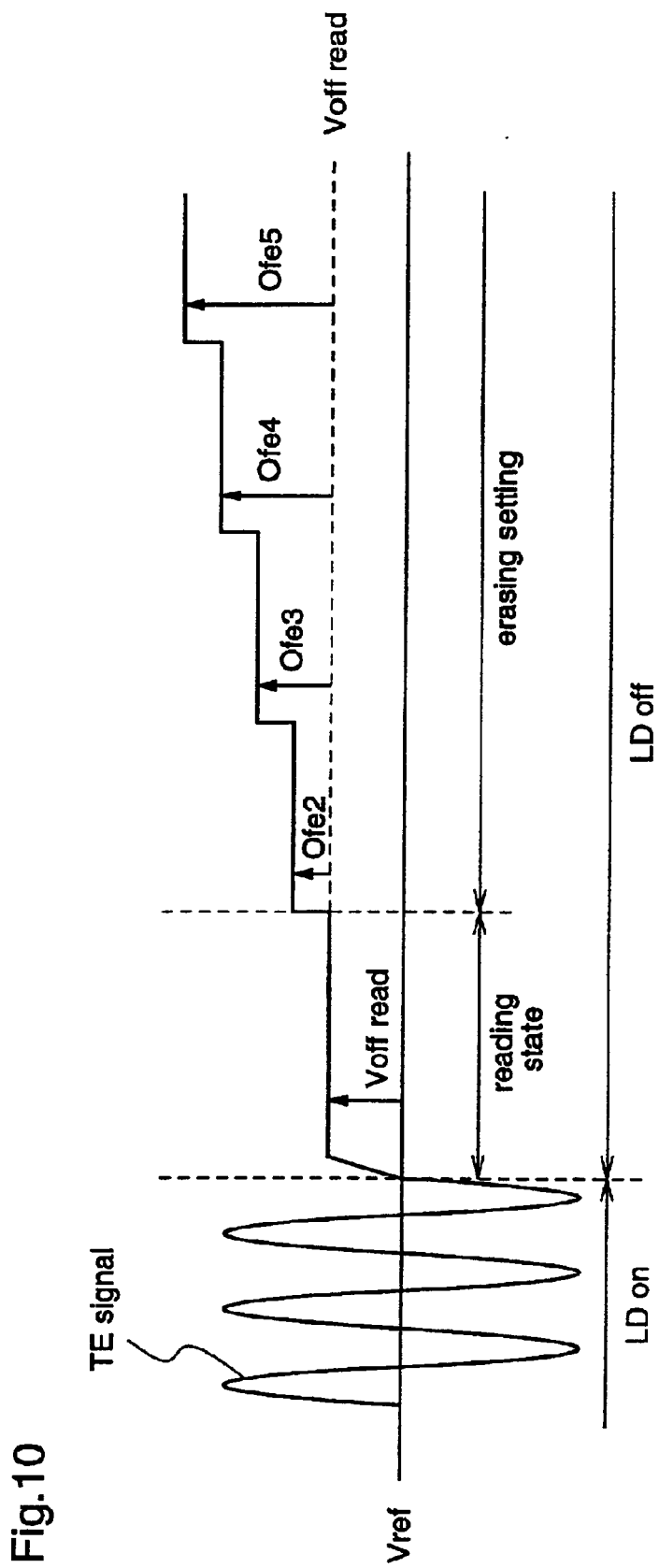
FIG. 10 is a diagram illustrating a method for calculating offset adjustment values, employed by the optical disk drive according to the third embodiment of the present invention.

FIG. 8 is a flowchart for explaining offset adjustment by the optical disk drive of the present invention. FIG. 9 is a diagram illustrating the push-pull method as the TE signal detection method, and FIG. 10 is a diagram illustrating the offset adjustment value calculation method by the optical disk drive of the present invention.

Hereinafter, the operation of the optical disk drive according to the third embodiment of the invention will be described with reference to FIGS. 7 to 10.

Initially, the drive is started or the disk is loaded (step S301) to turn on the spindle motor 2 and the laser of the optical pickup 1, whereby the drive goes into the spin-up operation (step S302).

During the spin-up operation, the first offset adjustment unit 13 subjects the tracking error signal TE1 generated by the error signal generation unit 4 to offset adjustment for canceling an offset of the signal TE1 from a reference voltage, and the gain adjustment unit 8 subjects the tracking error signal TE2 from the first offset adjustment unit 13 to gain adjustment for making the amplitude of the signal TE2 constant. Further, besides these automatic adjustments, disk discrimination by a disk discrimination means (not shown)

or the like is carried out (step S303). In the present invention, an offset adjustment value (Ofr), a gain adjustment value (Gr), and a reading laser power (Pr) in the reading state of the optical disk are obtained by the above-described automatic adjustments (step S304), and thereafter, these values are stored as first adjustment values in a first storage area provided in the storage means 7 (step S305).

In the case where the error signal generation unit 4 generates the TE signal by the push-pull method as shown in FIG. 9, a deviation of the optical axis of the photodetector (PD) as a light-receptive element may cause a difference in light amounts between left and right portions of the PD with respect to the tracking direction, and the difference in light amounts may cause an optical offset in the tracking error signal TE1. However, as described above, in the offset adjustment during the spin-up operation, a first offset adjustment value Ofr is added to the tracking error signal TE1 by the first offset adjustment unit 13, whereby the optical offset and an offset caused by the electric circuit are canceled, and the tracking error signal TE1 is adjusted to the reference voltage.

After the spin-up operation, the optical disk drive of the present invention starts the reading operation (step S307). However, when a writing command is supplied from an operation means such as a remote controller (not shown) to the CPU 11 in step S306, the reading operation shifts to the writing operation. At this time, the optical disk drive immediately starts the writing operation (step S309) when the optical disk 3 is judged as a CD-R disk by the disk discrimination operation performed during the spin-up operation (step S308). However, when the optical disk 3 is judged as a CD-RW disk, the CPU 11 performs the following operation in step S310.

First of all, the CPU 11 outputs a laser OFF command to the laser power switching circuit 12 to turn off the laser output from the optical pickup 1 (step S310). At this time, since no light is incident on the PDs, the tracking error signal TE1 is at the Vref level as shown in FIG. 10. However, when there is an optical offset of the tracking error signal TE1 due to a deviation of the optical axis of the PD, the offset adjustment unit 13 adds the offset adjustment value Ofr to the tracking error signal TE1 in the offset adjustment at spin-up, whereby Voffread is generated.

Since, as in the first and second embodiments, servo control is performed at the erasing power of the laser during reading of the CD-RW disk, the offset adjustment value and the gain adjustment value which are obtained when setting the erasing power are employed as the offset adjustment value and the gain adjustment value at writing. In the present invention, considering variations in characteristics of optical disks from maker to maker, in order to realize optimum writing operations for CD-RW disks having different characteristics, second to m-th (m: integer not less than 2) writing powers are previously set, and second to m-th adjustment values corresponding to the respective writing powers are obtained. In this third embodiment, for example, m=5.

Second to fifth gain adjustment values Ge2, Ge3, Ge4, and Ge5 are obtained according to formulae (2)~(5) as follows, respectively (step S311).

$$Ge2 = Gr \times (Pr/Pe2) \quad (2)$$

$$Ge3 = Gr \times (Pr/Pe3) \quad (3)$$

$$Ge4 = Gr \times (Pr/Pe4) \quad (4)$$

$$Ge5 = Gr \times (Pr/Pe5) \quad (5)$$

After obtaining the second to fifth gain adjustment values Ge2~Ge5, the CPU 11 sets the first to fifth gain adjustment values Ge2~Ge5 successively in the gain adjustment unit 8. At this time, assuming that the second to fifth gain adjustment values have the relationship, Ge2<Ge3<Ge4<Ge5, there occurs an increase in the offset which provides the relationship, Ofe2<Ofe3<Ofe4<Ofe5, with reference to the Voffread as the gain adjustment value increases, as shown in FIG. 10. The Voifread is an offset which is caused by the first offset adjustment value Ofr from the first offset adjustment unit 13 being added to the tracking error signal to make the tracking error signal during the reading operation be based on the Vref. When the Voffread is regarded as a reference level during the reading operation, the Ofe2~Ofe5 shown in FIG. 10 are offsets which are caused by the gain change from the reading operation to the writing operation.

The offset detection unit 6 detects the offsets Ofe2~Ofe5 generated in the tracking servo system, and obtains second to fifth offset adjustment values Ofe2~Ofe5 which cancel the offsets Ofe2~Ofe5, respectively (step S311). These second to fifth offset adjustment values Ofe2~Ofe5 as well as the second to fifth gain adjustment values Ge2~Ge5 and the second to fifth laser powers Pe2~Pe5 are stored as second to fifth adjustment values in second to fifth storage areas provided in the storage means 7, respectively (step S312).

During the actual operation, the optical disk drive of the present invention sets the first gain adjustment value Gr and the first offset adjustment value Ofr in the gain adjustment unit 8 and the first offset adjustment unit 13, respectively, and the optical pickup 1 emits the first laser power Pr, thereby performing the reading operation.

However, when starting the writing operation, in order to perform writing with an optimum laser power for the optical disk 3, the CPU 11 reads, for example, the third adjustment value from the third area in the storage means 7, and outputs a command for switching the laser power from the first laser power Pr to the third laser power Pe3 to the laser power switching circuit 12. Simultaneously, the CPU 11 sets the third gain adjustment value Ge3 in the gain adjustment unit 8, sets the first offset adjustment value Ofr in the first offset adjustment unit 13, and sets the third offset adjustment value Ofe3 in the second offset adjustment unit 14 (step S313). The driver 10 performs tracking control of the optical pickup 1 on the basis of the tracking error signal TE5 which is inputted through the first offset adjustment means 13, the gain adjustment unit 8, the second offset adjustment unit 14, and the control unit 9, and starts the writing operation (step S314).

As described above, in the optical disk drive according to the third embodiment of the present invention, when the optical disk drive shifts from the reading state of the CD-RW disk 3 to the writing operation with an arbitrary n-th (n=2, ..., m) laser power Pen, the laser power switching circuit 12 changes the laser power of the optical pickup 1 and, simultaneously, the first offset adjustment value Gr is set in the first offset adjustment unit 13 while the n-th offset adjustment value Ofen is set in the second offset adjustment unit 14. Therefore, appropriate offset adjustment can be performed even when an optical offset occurs in the tracking error signal due to a deviation of the optical axis of the PD, or the like. Accordingly, even when the laser power of the optical pickup 1 is switched from the first reading power Pr to the n-th writing power Pen and thereby the gain of the servo system changes significantly, the offset can be canceled with reliability, thereby providing an optical disk drive with stable operation.

APPLICABILITY IN INDUSTRY

According to the present invention, in an optical writing/reading apparatus which optically writes, erases, or reads a signal on a recording medium, when a first laser power is stored while a second laser power is used, the second laser power is calculated by arithmetic operation from the stored first laser power, and the first laser power is switched to the second laser power. Therefore, even when the gain of the servo system changes significantly, an offset can be canceled with reliability to maintain the stability of the servo system, thereby providing an optical disk drive with stable reading, erasing, and reading operations.

What is claimed is:

1. An optical disk drive comprising:

an optical pickup for emitting a laser to an optical disk as a recording medium, and signal processing a reflected light from the optical disk;

a servo error signal generation means for generating a servo error signal of a focusing and tracking servo system from the reflected light;

an offset detection means for detecting an offset, which occurs in the servo error signal due to defocusing or detracking of an objective lens in the optical pickup, and obtaining an offset adjustment value for canceling the offset;

an offset adjustment means for adding the offset adjustment value to the servo system to cancel the offset of the servo system, which is detected by said offset detection means;

a gain adjustment means for adjusting the gain of the servo system;

a laser power switching means for changing the power of the laser emitted from the optical pickup;

a command means for outputting an offset adjustment command, a gain adjustment command, and a laser power switching command to said offset adjustment means, said gain adjustment means, and said laser power adjustment means, respectively;

a storage means for holding an offset adjustment value, a gain adjustment value, and a laser power, which are to be set in said offset adjustment means, said gain adjustment means, and said laser power adjustment means, respectively; and a driving means for receiving the servo error signal, and outputting a driving signal for controlling said optical pickup, wherein a first gain adjustment value and a first offset adjustment value to be set in the servo system are stored in said storage means, when the laser power emitted from said optical pickup is a first laser power, wherein a second gain adjustment value to be set in the servo system when a second laser power is emitted from said optical pickup is obtained by arithmetic operation on the basis of the first gain adjustment value, the second gain adjustment value is set in said gain adjustment means, and a second offset adjustment value for canceling an offset which occurs in the servo system is obtained, and then, the second laser power, gain adjustment value, and offset adjustment value are stored in said storage means, and wherein when the first laser power is switched to the second laser power during the actual operation, switching of the laser power and switching from the first gain adjustment value and offset adjustment value to the second gain adjustment value and offset adjustment value are carried out simultaneously.

2. An optical disk drive as defined in claim 1, wherein the second gain adjustment value is in proportion to the reciprocal of a ratio of the second laser power when the first laser power is used as a reference.

3. An optical disk drive as defined in claim 1, wherein the first laser power is a laser power at a reading level, and the second laser power is a laser power at an erasing level.

4. An optical disk drive comprising:

an optical pickup for emitting a laser to an optical disk as a recording medium, and signal-processing a reflected light from the optical disk;

a servo error signal generation means for generating a servo error signal of a focusing and tracking servo system from the reflected light;

an offset detection means for detecting an offset which occurs in the servo error signal due to defocusing or detracking of an objective lens in said optical pickup, and obtaining an offset adjustment value for canceling the offset;

an offset adjustment means for adding the offset adjustment value to the servo system to cancel the offset of the servo system which is detected by said offset detection means;

a gain adjustment means for adjusting the gain of the servo system;

a laser power switching means for changing the power of the laser emitted from said optical pickup;

a command means for outputting an offset adjustment command, a gain adjustment command, and a laser power switching command to said offset adjustment means, said gain adjustment means, and said laser power switching means, respectively;

a storage means for holding an offset adjustment value, a gain adjustment value, and a laser power, which are to be set in said offset adjustment means, said gain adjustment means, and said laser power switching means, respectively; and a driving means for receiving the servo error signal, and outputting a driving signal for controlling said optical pickup, wherein a first gain adjustment value and a first offset adjustment value to be set in the servo system are stored in a first storage area provided in said storage means, when the laser power emitted from said optical pickup is a first laser power, wherein after the first gain adjustment value and offset adjustment value obtained by an adjustment operation are stored in said first storage area, said command means outputs a command for turning off the laser output from said optical pickup to the laser power switching means and, after the laser output is turned off, second to m-th (m: integer not less than 2) gain adjustment values to be set in the servo system when second to m-th laser powers are emitted from said optical pickup are obtained by arithmetic operation based on the first gain adjustment value, and the second to m-th gain adjustment values are set in the gain adjustment means, and then, second to m-th offset adjustment values for canceling offsets that occur in the servo system are obtained, and the second to m-th laser powers, gain adjustment values, and offset adjustment values are stored in second to m-th storage areas provided in said storage means, respectively, and wherein during the actual operation, when the laser power is switched from the first laser power to an n-th (n: integer not less than 2 and not larger than m) laser power among the second to m-th laser powers, switching of the laser power and switching of the first gain adjustment value and offset adjustment value to the n-th gain adjustment value and offset adjustment value are carried out simultaneously.

5. An optical disk drive as defined in claim 4, wherein the second to m-th gain adjustment values are in proportion to the reciprocals of ratios of the second to m-th laser powers, respectively, when the first laser power is used as a reference.

6. An optical disk drive as defined in claim 4, wherein the first laser power is a laser power at a reading level, and the second to m-th (m: integer not less than 2) laser powers are laser powers at erasing levels.

7. An optical disk drive comprising:

an optical pickup for emitting a laser to an optical disk as a recording medium, and signal-processing a reflected light from the optical disk;

a tracking error signal generation means for generating a tracking error signal of a tracking servo from the reflected light;

an offset detection means for detecting an offset which occurs in the tracking error signal due to detracking of an objective lens in said optical pickup or deviation of the optical axis of a photodetector, and obtaining an offset adjustment value for canceling the offset;

first and second offset adjustment means for adding two offset adjustment values to the tracking error signal to cancel the offset of the tracking error signal which is detected by said offset detection means;

a gain adjustment means for adjusting the gain of the tracking servo;

a laser power switching means for changing the power of the laser emitted from said optical pickup;

a command means for outputting an offset adjustment command, a gain adjustment command, and a laser power switching command to said first and second offset adjustment means, said gain adjustment means, and said laser power switching means, respectively;

a storage means for holding two offset adjustment values, a gain adjustment value, and a laser power, which are to be set in said first and second offset adjustment means, said gain adjustment means, and the laser power switching means, respectively; and a driving means for receiving the tracking error signal, and outputting a driving signal for controlling said optical pickup, wherein the offset adjustment and gain adjustment of the tracking servo are carried out after the focusing is turned on in the state where a first laser power is set in said laser power switching means, and the first offset adjustment value, gain adjustment value, and laser power which are set by the above-described adjustments are stored as first adjustment values in a first storage area provided in said storage means, wherein after the first adjustment values obtained by the adjustment operation are stored in said first storage area, said command means outputs a command for turning off the laser output to said laser power switching means and, after the laser output is turned off, second to m-th gain adjustment values to be set in the servo system when second to m-th (m: integer not less than 2) laser powers are emitted from said optical pickup are obtained by arithmetic operation based on the first gain adjustment value, and the second to m-th gain adjustment values are set in said gain adjustment means, and then, second to m-th offset adjustment values for canceling offsets that occur in the servo system are obtained, and the second to m-th laser powers, gain adjustment values, and offset adjustment values are stored in second to m-th storage areas provided in said storage means, respectively, and wherein during the actual operation, when the laser power is switched from the first laser power to an n-th laser power among the second to m-th laser powers, the first offset adjustment value and the n-th offset adjustment value are set in said first offset adjustment means and said second offset adjustment means, adjuster, respectively, simultaneously with the switching of the laser power from the first laser power to the n-th laser power.

8. An optical disk drive as defined in claim 7, wherein said tracking error signal generation means is operable to perform a push-pull tracking error signal generation method.

9. An optical disk drive as defined in claim 7, which the first laser power is a laser power at a reading level, and the second to m-th laser powers are laser powers at erasing levels.

* * * * *